3,313,686
PALATABLE ANTITUSSIVE AGENT-RESIN
COMPLEX
Wilbur L. Bryan, Belle Mead, Urs F. Nager, Princeton, and Frederick Y. Wiselogle, North Brunswick, N.J., assignors, by mesne assignments, to E. R. Squibb & Sons, Inc., New York, N.Y., a corporation of Delaware
No Drawing. Filed Aug. 24, 1962, Ser. No. 219,134
7 Claims. (Cl. 167—55)

This invention relates to new antitussive agents; and more particularly to orally-acceptable antitussive substances and formulations containing the same.

Compounds of the general formula

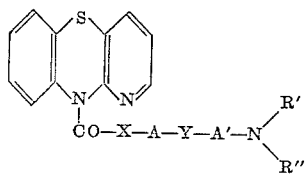

wherein X and Y are oxygen or sulfur, A and A' are lower alkylene radicals, and R' and R" are substituted or unsubstituted aliphatic radicals (e.g., lower alkyl) or together with the nitrogen to which they are joined R' and R" is an N-heterocyclic radical (e.g., piperidino, pyrrolidino and piperazino), as well as inorganic acid-addition salts thereof, are disclosed in U.S. Patent No. 2,989,529, as being useful as antitussive agents. Unfortunately, however, when attempts are made to administer such agents perorally in liquid preparations an extremely bitter taste is encountered seriously affecting the desirability of these compounds as oral medicaments.

It is an object of this invention, therefore, to provide a palatable, peroral antitussive agent, containing an azaphenothiazine medicament.

It is another object of this invention to provide a perorally acceptable formulation comprising an azaphenothiazine antitussive agent in palatable form.

These objects are achieved by the present invention, which essentially comprises an azaphenothiazine, such as one of those of the formula reproduced hereinbefore, adsorbed on a cation exchange resin. Such products, when perorally administered, preferably as aqueous suspensions, are devoid of any bitter taste and decompose readily in the stomach to yield substantially quantitative amounts of the adsorbed medicament. This discovery is believed to be surprising in view of the well known fact that many resin-medicament combinations are enteric by nature and are not decomposed until they reach the intestines.

Among the azaphenothiazines which can be used in preparing the products of this invention may be mentioned those compounds disclosed in said U.S. Patent No. 2,989,529. Such compounds include the following esters of 1-azaphenothiazine-10-carboxylic acid: the 2-diethylaminoethoxyethyl ester, the 2-piperidinoethoxyethyl ester, the 2-diethylaminoethylmercaptoethyl ester, the 2-diisopropylaminoethylmercaptoethyl ester, and the 2-diisopropylaminoethylmercaptoethyl thioester.

To prepare the products of this invention, one such ester, either in the form of its base or acid-addition salt (preferably an acid-addition salt with a mineral acid, such as a hydrohalic acid and sulfuric acid) is reacted with a cation exchange resin, in either its free acid or salt (e.g., alkali metal, such as sodium, salt) form. Among the suitable cation exchange resins can be mentioned carboxylic acid cation exchange resins, such as the copolymers of acrylic acid or methacrylic acid with divinyl aromatic compounds, such as divinylbenzene or other suitable iron-linking agents. Such resins include resins marketed by the Rohm & Haas Company under the name "Amberlite," such as Amberlite IRC-50 and Amberlite Micro XE-64, both copolymers of polymethacrylic acid and divinyl benzene, and Amberlite XE-89, a copolymer of polyacrylic acid and divinyl benzene. Certain other cation exchange resins containing sulfonic acid groups may also be used. These include such materials as Dowex 50 (available from Dow Chemical Company) or Amberlite XE-69 which are sulfonated polystyrene compounds cross-linked with a divinyl aromatic compound such as divinylbenzene.

To prepare the products of this invention the azaphenothiaizne and cation exchange resin are interacted, preferably in an aqueous, alcoholic or aqueous-alcoholic medium, by intermixing the azaphenothiazine and the resin in the medium. The reaction can be accomplished at any normal temperature, such as ambient temperature, and preferably is carried out at a temperature in the range of about 25° C. to about 35° C. Although any proportion of azaphenothiazine and resin may be used, to assure that an adequate amount of azaphenothiazine is adsorbed on the resin, the azaphenothiazine is preferably present in excess of that which can be adsorbed on the resin. Preferably about 0.2 to about 4 grams of azaphenothiazine is used per dry gram of resin, and optimally about 0.4 to about 0.6 gram of azaphenothiazine per dry gram of resin is used. If an acid-addition salt of azaphenothiazine is used as the reactant, the resin is preferably in its salt form and the reaction is carried out in an aqueous medium. If the azaphenothiazine is used as the free base, the resin is preferably in its acid form and the reaction is carried out in an alcoholic (e.g., lower alkanolic, such as methanolic) or aqueous-alcoholic medium.

The products of this invention may be administered perorally as such, or in a solid dosage unit form, such as a capsule or tablet; but preferably are administered in the form of an aqueous suspension by mixing with water and, if desired, the usual flavoring, coloring, and suspending agents and preservatives. The concentration of the product will depend on the azaphenothiazine content of the resin complex; the concentration being adjusted so as to yield about 5 mg. to about 50 mg., optimally about 20 mg. to about 40 mg., of azaphenothiazine per 5 cc. of suspension. If an XE-64 resin is used, about 250 mg. to about 500 mg. of azaphenothiazine is adsorbed on one gram of resin, so that about 15 mg. to about 250 mg. of resin complex per 5 cc. of suspension is used. To assure that the azaphenothiazine is retained on the resin in the suspension, the suspension is, if needed, preferably adjusted to a pH of about 5 to about 8, optimally about 5.5 to about 6.5.

The following examples illustrate the invention (all temperatures being in centigrade):

EXAMPLE 1

Prepartion of resin complex (a) *Preparation of the piperidinoethoxyethyl ester of 1-azaphenothiazinecarboxylic acid.*—300 g. of the hydrochloride salt of 2-[2-(piperidinoethoxy)]ethyl ester of 1-azaphenothiazine-10-carboxylic acid is dissolved in 900 ml. of distilled water and placed in a round bottom flask equipped with an agitator and an ice bath. 900 ml. of methylene chloride followed by 300 ml. of 40% KOH are added and the solution agitated for 30 minutes, maintaining the temperature at 20–25°. The rich solvent is separated off and the spent aqueous washed twice with 150 ml. portions of fresh methylene chloride, each for 5 minutes. The combined rich solvent is then washed twice with 150 ml. portions of distilled water, each for 5 minutes, and the water washes discarded. The rich solvent is clarified by slurrying 15 minutes with 60 gm. of MgSO₄, filtered under light vacuum, and the cake washed by displacement with three, 150 ml. portions of fresh methylene chloride. The clarified rich solvent is distilled under constant agitation (vapor temp. 40°) to a volume of 250–270 ml. resulting in a light amber syrup. This is added over a two hour period to 900 ml. of hexane, under agitation at 5–10° and seeded with 3 grams of the desired base. The resulting granular precipitate is filtered off, washed twice by displacement with 150 ml. portions of fresh hexane, and vacuum dried 16–24 hours at room temperature. Weight yield—252 grams or 92% of theory. Color—very pale yellow. Melting point—65–66°.

(b) *Preparation of the resin complex.*—194 g. of the 2-[2-(piperidinoethoxy)]ethyl ester of 1-azaphenothiazine-10-carboxylic acid is dissolved in 4.0 l. of methanol and placed in a round bottom flask equipped with an agitator and hot water bath. 400 g. of Amberlite Micro XE–64 (H) (372 dry grams) is added to the mixture agitated for four hours, maintaining a temperature of 30°. (Dosage of 1.3 meq. of base per dry gram of resin). The resulting resin complex is filtered off under vacuum through No. 1 paper, and slurried twice in 2.0 l. portions of fresh methanol for 30 minute periods. Each filtration is again made under vacuum through No. 1 paper. The resin complex is then vacuum dried for 16–24 hours at 50°, and screened through 60 mesh stainless steel. Expected weight yield—556 grams. Color—off-white.

In a similar manner, substitution of any of the other esters mentioned hereinbefore for the piperidinoethoxyethyl ester yields, by the procedure of Example 1, the corresponding resin complex.

EXAMPLE 2

Following the procedure of Example 1, step *b*, but employing an equivalent amount of the hydrochloride salt of the 2-[2-(piperidinoethoxy)]ethyl ester of 1-azaphenothiazine-10-carboxylic acid for the 2-[2-(piperidinoethoxy)]ethyl ester of 1-azaphenothiazine-10-carboxylic acid and an equivalent amount of Amberlite Micro XE–64 (Na) for the Amberlite Micro XE–64 (H), there is obtained a resin complex of the two ingredients.

Similarly, if any other cation exchange resin is substituted for the Amberlite Micro XE–64 in the procedures of either Example 1 or Example 2, the corresponding resin complexes are formed.

EXAMPLE 3

*Aqueous suspension of the resin complex*

To prepare an aqueous suspension of the resin complex the following ingredients are used:

| | |
|---|---:|
| The resin complex of Example 1 _____g____ | 15.45 |
| Methyl parahydroxybenzoate _____g____ | 0.50 |
| Propyl parahydroxybenzoate _____g____ | 0.25 |
| Menthol _____g____ | 0.05 |
| Disodium versenate _____g____ | 0.10 |
| Gum tragacanth _____g____ | 2.50 |
| Guar gum _____g____ | 1.50 |
| Sorbitol solution 70% _____g____ | 100.00 |
| Glycerin _____g____ | 10.00 |
| Alcohol 95% U.S.P. _____cc____ | 31.60 |
| Sugar _____g____ | 600.00 |

Distilled water, a sufficient quantity to make 1 liter.

The ingredients are intermixed in the usual manner to yield a suspension of the resin complex. The aqueous suspension prepared in Example 3 may be used in 5 cc. doses for the alleviation of coughs.

This invention may be variously otherwise embodied within the scope of the appended claims.

What is claimed is:

1. A complex of an azaphenothiazine of the formula

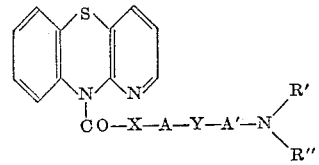

wherein X and Y are each selected from the group consisting of oxygen and sulfur, A and A' are each lower alkylene, R and R' are each lower alkyl, and together with the nitrogen to which they are joined R and R' is selected from the group consisting of piperidino, pyrrolidino and piperazino, and a carboxylic acid cation exchange resin.

2. A complex of the 2-[2-(piperidinoethoxy)]ethyl ester of 1-azaphenothiazine-10-carboxylic acid and a carboxylic acid cation exchange resin.

3. A complex of the 2-[2-(piperidinoethoxy)]ethyl ester of 1-azaphenothiazine-10-carboxylic acid and a resin which is the copolymer of polymethacrylic acid and divinylbenzene.

4. An antitussive composition which comprises (a) the complex of claim 1 and (b) a pharmaceutically-acceptable carrier.

5. An antitussive composition which comprises (a) the complex of claim 1 and (b) an aqueous pharmaceutically-acceptable carrier, said complex being present in such concentration as to provide about 5 mg. to about 50 mg. of the azaphenothiazine per 5 cc. of composition.

6. An antitussive composition which comprises an aqueous suspension of a complex of the 2-[2-(piperidinoethoxy)]ethyl ester of 1-azaphenothiazine-10-carboxylic acid and a carboxylic acid cation exchange resin, said complex being present in such concentration as to provide about 5 mg. to about 50 mg. of the ester per 5 cc. of suspension.

7. An antitussive composition which comprises an aqueous suspension of a complex of the 2-[2-(piperidinoethoxy)]ethyl ester of 1-azaphenothiazine-10-carboxylic acid and a resin which is the copolymer of polymethacrylic acid and divinylbenzene, said complex being present in a concentration of about 15 mg. to about 250 mg. per 5 cc. of suspension.

References Cited by the Examiner

UNITED STATES PATENTS

| | | | |
|---|---|---|---|
| 2,989,529 | 6/1961 | Schuler | 260—243 |
| 2,990,332 | 6/1961 | Keating | 167—72 B |
| 3,070,508 | 12/1962 | Siegel | 167—72 B |
| 3,085,942 | 4/1963 | Magid | 167—72 B |

OTHER REFERENCES

Patent Journal (South Africa), Nov. 29, 1961, page 20.

ALBERT T. MEYERS, *Primary Examiner.*

FRANK CACCIAPAGLIA, Jr., A. P. FAGELSON,
*Assistant Examiners.*